United States Patent [19]

Kallenbach et al.

[11] Patent Number: 5,324,068
[45] Date of Patent: Jun. 28, 1994

[54] METHOD FOR SEMIACTIVE CHASSIS CONTROL

[75] Inventors: Rainer Kallenbach, Stuttgart; Michael Wanner, Holzgerlingen, both of Fed. Rep. of Germany

[73] Assignee: Robert Bosch GmbH, Stuttgart, Fed. Rep. of Germany

[21] Appl. No.: 13,138

[22] Filed: Feb. 3, 1993

Related U.S. Application Data

[63] Continuation of Ser. No. 788,634, Nov. 6, 1991, abandoned.

[30] Foreign Application Priority Data

Nov. 7, 1990 [DE] Fed. Rep. of Germany ....... 4035314

[51] Int. Cl.$^5$ ............................................. B60G 17/08
[52] U.S. Cl. ................................. 280/707; 364/424.05
[58] Field of Search .............................. 280/707, 714

[56] References Cited

U.S. PATENT DOCUMENTS

| | | | |
|---|---|---|---|
| 4,743,000 | 5/1988 | Karnopp | 188/319 |
| 4,786,034 | 11/1988 | Hess et al. | 267/64.15 |
| 4,800,995 | 1/1989 | Bernhardt et al. | 188/319 |
| 4,887,699 | 12/1989 | Ivers et al. | 280/714 |
| 4,936,423 | 6/1990 | Karnopp | 188/299 |
| 4,936,425 | 6/1990 | Boone et al. | 280/707 |
| 5,024,302 | 6/1991 | Karnopp | 188/299 |

FOREIGN PATENT DOCUMENTS

| | | | |
|---|---|---|---|
| 270893 | 6/1988 | European Pat. Off. | 280/707 |
| 3611315 | 10/1987 | Fed. Rep. of Germany. | |

Primary Examiner—Karin L. Tyson
Attorney, Agent, or Firm—Edwin E. Greigg; Ronald E. Greigg

[57] ABSTRACT

In a method for semiactive chassis control, in particular for damping resilient wheel suspension systems in vehicles, having a piston displaceable in a cylinder and subdividing it into two work chambers, the cylinder and piston are each connected to a vehicle body or a wheel axle. At least one valve that controls the flow of pressure fluid into and out of the work chambers is associated with the work chambers. Control of the valve is effected as a function of an absolute vertical speed of the vehicle body and of a zero crossover of the relative speed of the relative motion between the axle or wheel in the vehicle body and/or of a zero crossover of the damper force and/or of a zero crossover of the differential pressure at the damper piston.

24 Claims, 2 Drawing Sheets

METHOD FOR SEMIACTIVE CHASSIS CONTROL

This is a continuation of copending application Ser. No. 07/788,634 filed on Nov. 6, 1991, now abandoned.

BACKGROUND OF THE INVENTION

The invention relates to a method for semiactive chassis control, in particular for damping resilient wheel suspension systems in vehicles.

From the standpoint of vibration control, two essential sources of trouble affect the vehicle. One of them is unevenness of the road surface, which causes vertical wheel motions as well as up-and-down, pitching and rolling vibration of the vehicle body; secondly, undesirable vehicle motions are also caused by driver interventions, such as turning, accelerating and braking. All these thus-induced vibrations definitively affect the comfort of the ride and driving safety.

For optimal damping of the body motion of a vehicle, the ideal component would be an inertially guided damper that is built in between a hypothetical rail, extending parallel to and above the road surface, and the body.

However, a so-called skyhook damper of this kind, as described for instance in "Optimierung des Fahrzeugverhaltens mit semiaktiver Fahrwerkregelung" [Optimizing Vehicle Performance with Semiactive Chassis Control], VDI-Berichte [Reports of Association of German Engineers] No. 699, 1988, pp. 121 ff. is not industrially feasible. It is approximately feasible industrially, however, for a built-in damper between the wheel and the body to be triggered as a function of the absolute vertical speed of the body. This can be done by feedback of the speed signal at each wheel unit individually to the applicable damper, or on the basis of the total motion of the body, which is composed of up-and-down, pitching and rolling motions. The control is then done in accordance with suitable algorithms, and control valves on the various dampers are controlled directly.

Another problem area arises with regard to the direction in which a damping force should act, that is, whether a damping force should be varied when the piston rod is moving outward, known as the tension stage, or with the piston rod moving inward, known as the compression stage. The direction of the damping force (tension or compression) cannot be controlled arbitrarily, as will be readily understood; instead, it depends on the instantaneous direction of the relative speed between the body and wheel or wheel suspension, and in principle works in the opposite direction thereto. Some patent publications do exist in which the tension and compression stages of a damper are triggered separately and are decoupled from one another hydraulically by means of check valves. Among these can be named the following German published patent applications: 35 24 863, 35 24 862, 36 11 315, 37 61 506 and 36 10 937. However, it is apparent in these systems that work is done with at least two valves hydraulically decoupled from one another by means of check valves, which have considerable disadvantages in terms of expense and control.

OBJECTS AND SUMMARY OF THE INVENTION

It is a principal object of the method according to the present invention to provide that hydraulic decoupling of the tension and compression stages can be attained by means of only a single rapidly adjustable valve. This one valve then also permits the integration of the valve assembly into the damper itself, so that the space required for the valve assembly can be reduced considerably, and components that are easier to install can be obtained. Depending upon the direction of motion of the vehicle body, either the tension or the compression stage of the damper must be set to be soft or hard for optimal damping of the vehicle body. This variation in the valve position takes place according to the invention at the zero crossover of the relative speed of the relative motion between the wheel and the body, that is, at the instant when the damper force equals zero. As a parameter for this, the differential pressure at the damper piston that prevails between the upper and lower work chambers can also be used. The adjustment frequency is in the range of at least twice the natural frequency of the wheel. By suitable variation of the flow pressure fluid out of and into the various work chambers of the damper, the force that counteracts the motion of the vehicle body can be reinforced, and the force acting in the direction of body motion can be reduced. At the same time, a minimum damping (basic damping) at the valve must also be guaranteed. If very severe wheel motions are detected, it must be possible to adjust the necessary damper force for optimal wheel damping.

It is another object of the method according to the invention to require not only fast-switching valves but also sensors, which ascertain either the zero crossover of the relative speed of the vehicle body and the wheel or of the damper force, or the zero crossover of the differential pressure at the damper piston. A suitable control algorithm processes one of these signals along with the applicable signal for the vertical speed of the vehicle body, and triggers the valves suitably, via a power end stage of a control unit.

It is yet another object of the invention that the sensors necessary for the valve switching function can also be used simultaneously for other functions. The relative speed can thus be calculated by differentiating the relative travel signal, and at the same time the relative travel signal can be used for level-control systems or to detect load changes and associated adaptations in brake force distribution, and so forth.

To achieve the present semiactive damper control concept, the applicable valves can have various embodiments. Besides fast-switching valves, which are present in the form of throttle valves with two or more valve opening cross sections for different flows of pressure fluid or in the form of pressure limiting valves with two or more pressure stages in the pilot-controlled or direct-controlled version, continuously adjustable throttle valves or pressure limiting valves with highly dynamic adjustment can be used. In each case, there is a flow through the valves in the tension and compression stages, so that they must be capable of varying their operating characteristics for each transition between stages. This is an essential distinction from the valves used in known control systems, because those valves are embodied merely as check valves.

If continuously adjustable valves are used, then it is also possible to seek to have the aforementioned sensors not only detect the zero crossovers directly but also furnish instantaneous sensor values. Because of the extremely short cycling times of the control algorithm, a defined triggering of the continuously adjustable valve takes place at every moment, thus enabling optimal exploitation of the intervention potential of this valve.

The use of continuously adjustable valves in particular enables optimal wheel damping, in contrast to severe wheel damping with switching valves, and so the optimal wheel damping is directed to minimizing dynamic wheel load fluctuations.

The control strategy required to achieve the method of the invention is based on a closed control loop, which when switching valves are used is suitably expanded with a fast-value detection means or gate function; preparation of the electrical sensor signals, employment of the control strategy, and triggering of the valves are performed in an electrical control unit.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
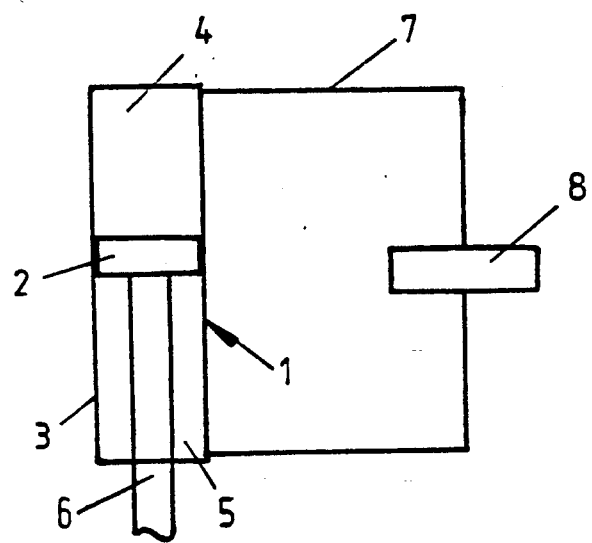
FIG. 1 is a basic diagram showing part of a chassis control according to the invention.

Referring now the FIG. 1, to present semiactive chassis control according to the invention relates above all to the control of shock absorbers 1, which are disposed between a vehicle body, not shown in further detail, and an axle or wheel suspension, again not shown in further detail.

The shock absorber 1 comprises a cylinder 3, in which a damper piston 2 partitions an upper work chamber 4 off from a lower work chamber 5. A piston rod 6, which is joined to the damper piston 2, leads out of one of the work chambers 4, 5.

The upper work chamber 4 and lower work chamber 5 communicate with one another via a pressure fluid line 7 into which a valve 8 is incorporated. This valve 8 may for instance be a fast-switching two-position or multiposition throttle valve, a pressure limiting valve in a pilot- or direct-controlled version, or a continuously adjustable throttle valve or pressure limiting valve. The only essential feature is that the valve, in terms of the flow of pressure fluid in the line 7, can enable a decrease or increase in the differential pressure at the valve, regardless of the direction in which the pressure fluid flows between the two work chambers 4 and 5. By suitable variation of the flow pressure fluid out of and into the various work chambers of the damper, the force that counteracts the motion of the vehicle body can be reinforced, and the force acting in the direction of body motion can be reduced. At the same time, a minimum damping (basic damping) at the valve must also be guaranteed. If very severe wheel motions are detected, it must be possible to adjust the necessary damper force for optimal wheel damping. Suitable switching actions of the valve can be called hard or soft. The pressure fluid line 7 can also be integrated with the damper piston 2, in series with the valve element 8.

Figure 2:
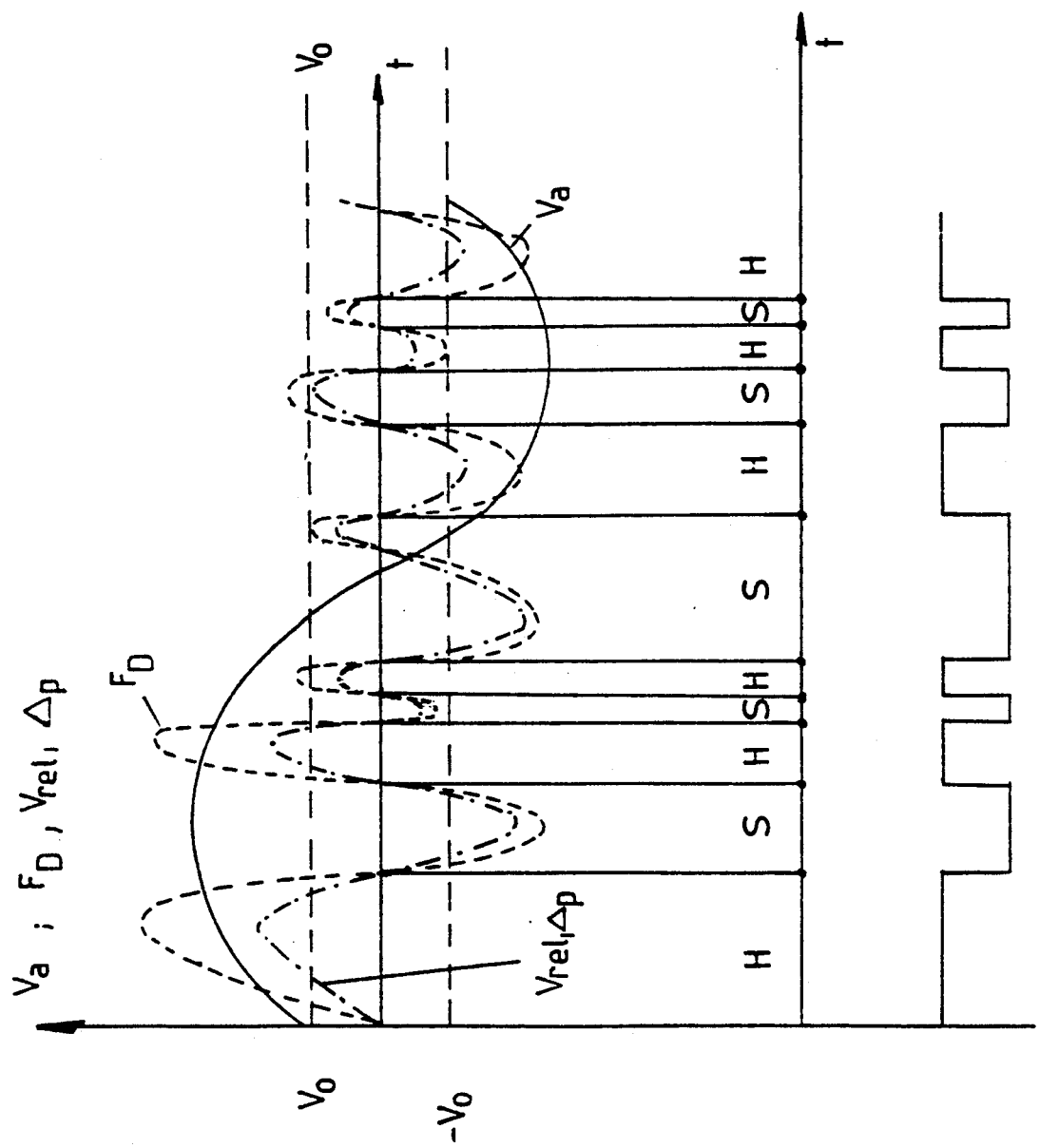
FIG. 2 is a diagram for switching a valve, also showing appropriate switching times.

For switching the valve, the relative speed of the relative motion between the axle or wheel in the vehicle body, the damper force, and/or the differential pressure at the damper piston is definitive according to the invention. For further explanation of these parameters and their relationship, see "Optimierung des Fahrzeugverhaltens mit Semiaktiver Fahrwerkregelung" [Optimizing Vehicle Performance with Semiactive Chassis Control], VDI-Berichte [Reports of the Association of German Engineers] No. 699, 1988, pp. 121 ff., and German published patent application 35 24 862. FIG. 2 shows the events when a two-stage discretely-switching valve is used, but in principle it also applies to continuous systems. The various symbols have the following meanings:

$V_a$ speed of the vehicle body wheel $v$ speed of the vehicle body $v_0$ threshold value of the vehicle body speed beyond which body control is activated $V_{rel} = v - V_a$ differential speed between wheel and vehicle body $F_D$ damping force $\Delta p$ differential pressure at the damper piston If the damping force $F_D$, differential speed $V_{rel}$ between the wheel and the vehicle body and the differential pressure $\Delta p$ are plotted on a time axis, the result is a sinusoidal motion; in FIG. 2, the absolute speed of the vehicle body wheel is shown in a solid line, the damper force $F_D$ in a dashed line, and the differential speed $V_{rel}$ between the wheel and the vehicle body in a dot-dash line. The curve for the differential speed $V_{rel}$ corresponds to the curve for the differential pressure $\Delta p$ at the damper piston.

In the illustration of the switching times, it can be seen that the valve switches over each time at a zero crossover of the differential speed $V_{rel}$ or differential pressure $\Delta p$ or damper force $F_D$, in each case from a hard switching position to a soft one. The corresponding switching principles for vehicle body damping are as follows:

|  | tension | compression |
| --- | --- | --- |
| $V_a > V_0$; $V_{rel} > 0$ or $\Delta p > 0$ | H | (H) |
| $V_a > V_0$; $V_{rel} < 0$ or $\Delta p < 0$ | (S) | S |
| $-V_0 < V_a < V_0$ | S | S |
| $V_a < -V_0$; $V_{rel} > 0$ or $\Delta p > 0$ | S | (S) |
| $V_a < -V_0$; $V_{rel} < 0$ or $\Delta p < 0$ | (H) | H |

Hard and soft (H, S) occur in this form only when switching valves are used. Continuous-operation valves make it possible to more finely adjust the hardness or softness as a function of various parameters. Taking optimal wheel damping into account simultaneously for calming the vehicle body motion, further criteria for optimal damper force adjustment at the vehicle body and wheel are superimposed on the switching principle described above. The threshold value of the vehicle body speed $V_0$ is intended to prevent unnecessary variations in damper force from occurring in the high-frequency range.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for semiactive chassis control to damp resilient wheel suspension systems in vehicles, having a damper piston displaceable in a cylinder in which said piston divides said cylinder into two work chambers and at least one fast switching valve connected to the two work chambers, comprising the following steps:

connecting the cylinder and the piston each to one of a vehicle body and a wheel axle, connecting at least one fast switching valve with each of the work chambers, arranging said at least one fast switching valve to control a two-way flow of pressure fluid into and out of each of the work chambers, manipulating a control of the at least one fast switching valve as a function of an absolute vertical speed ($V_a$) of the vehicle body and of a zero crossover of a relative speed ($V_{rel}$) of a relative motion between the wheel axle and the vehicle body in order to vary the flow of the pressure fluid out of and into said two work chambers, reinforcing a damper force ($F_D$) upon a relative motion between the wheel axle and the vehicle body via said at least one fast switching valve that counteracts the body motion and correspondingly reducing the damper force ($F_D$) acting in a direction of the body motion, and simultaneously adjusting a minimum basic damping of the motion of the wheel axle without detection of any very severe wheel motions, and adjusting a high damping of the motion of the wheel if very severe wheel motions are detected for optimal wheel damping.

2. The method defined by claim 1, further comprising the step of sensing at least one of the zero crossover of the relative speed ($V_{rel}$) of the relative motion between the wheel and the vehicle body, the zero crossover of the damper force ($F_D$) and the zero crossover of the differential pressure ($\Delta p$) at the damper piston.

3. The method defined by claim 1, further comprising the step of detecting continuously at least one of the relative speed ($V_{rel}$) of the relation motion between the wheel and the vehicle body, the damper force ($F_D$) and the differential pressure ($\Delta p$) at the damper piston.

4. The method defined by claim 1, further comprising the step of operating the valve to enable a decrease or increase in the differential pressure at the valve, regardless of the flow direction of a pressure fluid communicating between the two work chambers.

5. The method defined by claim 1, further comprising the steps of adjusting said high damping via a non-variable passive damper force dependent upon the relative speed between the wheel axle and the vehicle body.

6. The method defined by claim 5, further comprising the step of sensing at least one of the zero crossover of the relative speed ($V_{rel}$) of the relative motion between the wheel and the vehicle body, the zero crossover of the damper force ($F_D$) and the zero crossover of the differential pressure ($\Delta p$) at the damper piston.

7. The method defined by claim 5, further comprising the step of detecting continuously at least one of the relative speed ($V_{rel}$) of the relative motion between the wheel and the vehicle body, the damper force ($F_D$) and the differential pressure ($\Delta p$) at the damper piston.

8. The method defined by claim 5, further comprising the step of operating the valve to enable a decrease or increase in the differential pressure at the valve, regardless of the flow direction of a pressure fluid communicating between the two work chambers.

9. The method defined by claim 1, further comprising the step of adjusting said high damping by activating a super position damping especially in the high-frequency motion range of the wheel.

10. The method defined by claim 8, further comprising the step of sensing at least one of the zero crossover of the relative speed ($V_{rel}$) of the relative motion between the wheel and the vehicle body, the zero crossover of the damper force ($F_D$) and the zero crossover of the differential pressure ($\Delta p$) at the damper piston.

11. The method defined by claim 9, further comprising the step of detecting continuously at least one of the relative speed ($V_{rel}$) of the relative motion between the wheel and the vehicle body, the damper force ($F_D$) and the differential pressure ($\Delta p$) at the damper piston.

12. The method defined by claim 9, further comprising the step of operating the valve to enable a decrease or increase in the differential pressure at the valve, regardless of the flow direction of a pressure fluid communicating between the two work chambers.

13. The method defined by claim 1, further comprising the step of continuously adjusting said at least one valve.

14. The method as defined in claim 13 in which said at least one valve is a continuously, rapidly adjusting, multiposition throttle valve.

15. The method as defined in claim 13 in which said at least one valve is a continuously adjustable pressure limiting valve.

16. The method defined by claim 1, further comprising adjusting the at least one valve discretely in stages.

17. The method defined by claim 16 further comprising a continuously rapidly adjusting multiposition throttle valve.

18. The method defined by claim 16 further comprising a continuously adjustable pressure limiting valve.

19. A method for semiactive chassis control, in particular to damp resilient wheel suspension systems in vehicles, having a piston displaceable in a cylinder which divides said cylinder into two work chambers and at least one fast switching valve connected to each of said two work chambers, comprising the following steps:

connecting the cylinder and the piston each to one of a vehicle body and a wheel axle, connecting at least one fast switching valve with each of the work chambers, arranging said fast switching valve to control a flow of pressure fluid into and out of each of the work chambers, manipulating control of the at least one fast switching valve as a function of an absolute vertical speed ($V_a$) of the vehicle body and of a zero crossover of a differential pressure (p) at the damper piston in order to vary the flow of the pressure fluid out of and into said two work chambers, reinforcing a damper force ($F_D$) upon a relative motion between the wheel axle and the vehicle body via said fast switching valve that counteracts the body motion and correspondingly reducing a damper force ($F_D$) acting in a direction of the body motion, and simultaneously adjusting a minimum basic damping for the motion of the wheel, and adjusting a high damping of the motion of the wheel if very severe wheel motions are detected for optimal wheel damping.

20. The method defined by claim 19, further comprising the step of sensing at least one of the zero crossover of the relative speed ($V_{rel}$) of the relative motion between the wheel and the vehicle body, the zero crossover of the damper force ($F_D$) and the zero crossover of the differential pressure ($\Delta p$) at the damper piston.

21. The method defined by claim 19, further comprising the step of detecting continuously at least one of the relative speed ($V_{rel}$) of the relative motion between the wheel and the vehicle body, the damper force ($F_D$) and the differential pressure ($\Delta p$) at the damper piston.

22. The method defined by claim 19, further comprising the step of operating the valve to enable a decrease or increase in the differential pressure at the valve, regardless of the flow direction of a pressure fluid communicating between the two work chambers.

23. The method defined by claim 19, further comprising the step of adjusting said high damping via a non-variable passive damper force dependent upon the relative speed between the wheel axle and the vehicle body.

24. The method defined by claim 19, further comprising the step of adjusting said high damping by activating a super position damping especially in the high-frequency motion range of the wheel axle.

* * * * *